US012615513B2

(12) United States Patent
Comarmond

(10) Patent No.: US 12,615,513 B2
(45) Date of Patent: Apr. 28, 2026

(54) UPDATING A SUBSCRIBER IDENTITY MODULE

(71) Applicant: SORACOM, Inc., Setagaya-ku (JP)

(72) Inventor: Georges Olivier Comarmond, Beau Bassin (MU)

(73) Assignee: SORACOM, Inc., Tokyo (JP)

( * ) Notice: Subject to any disclaimer, the term of this patent is extended or adjusted under 35 U.S.C. 154(b) by 79 days.

(21) Appl. No.: 18/590,240

(22) Filed: Feb. 28, 2024

(65) Prior Publication Data

US 2024/0205681 A1     Jun. 20, 2024

Related U.S. Application Data

(63) Continuation of application No. 17/964,745, filed on Oct. 12, 2022, now Pat. No. 11,937,088, which is a continuation of application No. 15/733,834, filed as application No. PCT/SG2019/050326 on Jul. 1, 2019, now Pat. No. 11,503,473.

(30) Foreign Application Priority Data

Jul. 2, 2018     (EP) ..................................... 18181266

(51) Int. Cl.
| | |
|---|---|
| *H04W 12/30* | (2021.01) |
| *H04L 9/08* | (2006.01) |
| *H04W 8/20* | (2009.01) |
| *H04W 12/069* | (2021.01) |
| *H04W 12/72* | (2021.01) |

(52) U.S. Cl.
CPC ........... *H04W 12/35* (2021.01); *H04L 9/0861* (2013.01); *H04W 8/205* (2013.01); *H04W*
*12/069* (2021.01); *H04W 12/72* (2021.01); *H04L 2209/80* (2013.01)

(58) Field of Classification Search
CPC ... H04W 12/35; H04W 8/205; H04W 12/069; H04W 12/72; H04W 12/69; H04W 12/02; H04W 12/04; H04W 12/06; H04W 4/60; H04L 9/0861; H04L 2209/80
See application file for complete search history.

(56) References Cited

U.S. PATENT DOCUMENTS

| | | | |
|---|---|---|---|
| 9,949,113 B1 | 4/2018 | Vasudevan et al. | |
| 2002/0012433 A1* | 1/2002 | Haverinen | ............ H04W 12/06 |
| | | | 380/247 |
| 2006/0205388 A1* | 9/2006 | Semple | ............. H04W 12/0431 |
| | | | 455/433 |
| 2007/0208936 A1* | 9/2007 | Ramos Robles | ... H04L 63/0815 |
| | | | 713/168 |

(Continued)

FOREIGN PATENT DOCUMENTS

| | | |
|---|---|---|
| JP | 2017-500798 | 1/2017 |
| JP | 2018-511964 | 4/2018 |

*Primary Examiner* — Mazda Sabouri
(74) *Attorney, Agent, or Firm* — COZEN O'CONNOR

(57)     ABSTRACT

A method performed by a server, the method comprising transmitting a value to an authentication entity; receiving a first message from the authentication entity wherein the first message is generated using the value; deriving a pre-shared key using the first message; transmitting the value to a device over a network; encrypting a second message using the pre-shared key; and transmitting the encrypted second message over the network to the device

16 Claims, 7 Drawing Sheets

(56)  References Cited

U.S. PATENT DOCUMENTS

| 2008/0132279 | A1 | 6/2008 | Blumenthal |
| 2008/0181401 | A1* | 7/2008 | Picquenot ............. H04L 9/3271 |
| | | | 380/247 |
| 2010/0037053 | A1 | 2/2010 | Stenberg |
| 2010/0069039 | A1 | 3/2010 | Kawamura |
| 2011/0246777 | A1 | 10/2011 | Buckley |
| 2014/0295794 | A1 | 10/2014 | Doumen |
| 2016/0104154 | A1 | 4/2016 | Milov et al. |
| 2016/0352698 | A1 | 12/2016 | Long |
| 2016/0379006 | A1 | 12/2016 | Merrien |
| 2017/0064552 | A1 | 3/2017 | Park et al. |
| 2017/0214524 | A1 | 7/2017 | Berard et al. |
| 2018/0020351 | A1 | 1/2018 | Lee |
| 2018/0027410 | A1 | 1/2018 | Berard et al. |
| 2018/0070224 | A1 | 3/2018 | Park et al. |
| 2019/0327610 | A1 | 10/2019 | Rajadurai |

* cited by examiner

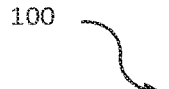

| SIM | COMM. MODULE | OTA SERVER |
|---|---|---|

1. SMS PUSH OTA

2. ENVELOPE

3. OPEN CHANNEL     4. OPEN TCP LINK

5. TCP LINK OPENED

6. CHANNEL OPEN

7. SEND DATA     8. HTTPS REQUEST (IDENTITY)

9. HTTPS RESPONSE (OTA MESSAGE)

10. DATA AVAILABLE

11. RECEIVE DATA

13. EXEC.     12. DATA RECEIVED

14. SEND DATA     15. HTTPS REQUEST (OTA RESPONSE)

16. HTTPS RESPONSE (BLANK BODY)

17. DATA AVAILABLE

18. RECEIVE DATA

19. DATA RECEIVED

20. CLOSE CHANNEL     21. CLOSE TCP LINK

22. TCP LINK CLOSED

23. CHANNEL CLOSED

Figure 1

PRIOR ART

UPDATING A SUBSCRIBER IDENTITY MODULE

RELATED APPLICATIONS

This application is a continuation of Ser. No. 17/964,745 filed Oct. 12, 2022 which is a Continuation of U.S. patent application Ser. No. 15/733,834 filed Nov. 30, 2020, which is a U.S. National Stage of International Application No. PCT/SG2019/050326 filed Jul. 1, 2019, which claims priority of European application no. 18181266.0 filed Jul. 2, 2018, the entire content of which are hereby incorporated by reference.

FIELD OF THE INVENTION

The present disclosure relates to updating a subscriber identity module (SIM) on a host device.

BACKGROUND OF THE INVENTION

Mobile network operators are often faced with the challenge of updating their SIM cards in the field to deploy fixes or new applications. The current standard for this is called Over-The-Air (OTA) and it usually requires that the subscription plan supports Short Message Service (SMS). With the advent of 4G technologies, a new form of OTA has emerged: HTTP OTA. This is described for example in "Global Platform Card Specification Version 2.2, Amendment B Version 1.1"; ETSI TS 102 225: "Smart Cards; Secured packet structure for UICC based applications"; and ETSI TS 102 226: "Smart cards; Remote APDU structure for UICC based applications".

HTTP OTA is a technology which enables the delivery of remote management commands to the SIM card over an IP network instead of using the predecessor technology, SMS OTA.

In parallel to the advent of 4G technologies, there has been an emergence of autonomous connected devices which has caught the name of Internet-of-things (IoT). Numerous mobile IoT devices are networked nowadays using SIM-enabled communications modules (e.g. a HSPDA modem).

SUMMARY OF THE INVENTION

The inventor has recognised that many manufacturers of SIM-enabled communication modules chose not to implement the necessary support for HTTP OTA through implementation of Bearer Independent Protocol (BIP) in the communication module. This is due to various reasons including increased cost and effort for development and test of the communication module. On the other hand, the support for HTTP OTA through BIP was implemented quite rapidly in the new UICC cards by SIM vendors.

Currently, support for BIP inside communication modules, is only available in some high-end phones and in communication modules which can host SIM cards of type eUICC in MFF2 form factor. Consequently, most communication modules which interface with the removable SIM formats (mini SIM, micro SIM and nano SIM), do not support HTTP OTA. Furthermore, in many deployments of IOT projects, the only available communication bearer is an IP network.

In order to cater for this lack of support for HTTP OTA, embodiments of the present disclosure implement a software agent which can help to securely channel the OTA commands to the SIM card found inside a legacy communication module by taking over the HTTP part and using the hosted SIM (UICC, eUICC, iUICC or SoftSIM) as a secure element to establish a secure communication channel.

According to one aspect of the present disclosure there is provided a method of deriving a shared key for use in communicating with a network entity, wherein the method is performed by an agent on a host device and comprises: requesting a SIM identifier of a subscriber identity module (SIM) on the host device from a communication module of the host device; receiving the SIM identifier from the communication module and deriving an agent identifier from the SIM identifier; transmitting the agent identifier and the SIM identifier over a network to the network entity; receiving, via said network, a random value from the network entity; supplying the random value to the communication module to initiate a SIM authentication procedure, and in reply receive an authentication response from the communication module; and deriving the shared key from the authentication response.

According to another aspect of the present disclosure there is provided a method of updating a subscriber identity module, SIM, on a host device, wherein the method is performed by an agent on the host device and comprises: deriving a pre-shared key, said deriving comprising: requesting a SIM identifier of the SIM via a communication module of the host device; receiving the SIM identifier from the SIM via the communication module and deriving an agent identifier from the SIM identifier; transmitting the agent identifier and the SIM identifier over a network to a SIM update server; receiving, via said network, a random value from the SIM update server; supplying the random value to the SIM via the communication module to initiate a SIM authentication procedure, and in reply receive an authentication response from the SIM via the communication module; and deriving the pre-shared key from the authentication response; transmitting an update request message over said network to the SIM update server, wherein the update request message comprises said agent identifier and is encrypted prior to transmission using the pre-shared key; receiving an update response message, via said network, from the SIM update server, wherein the update response message comprises update data and is encrypted using the pre-shared key; following decryption of the update response message using the derived pre-shared key, transmitting the update data to the communication module for relaying to the SIM for execution to update the SIM.

The authentication response may comprise a signed response and a cipher key.

Deriving the pre-shared key from the authentication response may comprise using at least one of the signed response and the cipher key to derive the pre-shared key.

Deriving the pre-shared key from the authentication response may comprise using the random value to derive the pre-shared key.

Deriving the pre-shared key from the authentication response may comprise concatenating the cipher key with itself to generate a concatenated result and applying a bitwise XOR operation on the concatenated result and the random value to derive the pre-shared key.

The update data may be encrypted with a symmetric cryptographic key stored by the SIM.

The update request message may comprise the SIM identifier.

The method may further comprise: in response to transmitting the update data to the communication module: receiving an execution result from the SIM via the communications module; and transmitting a further update request message over said network to the SIM update server, the update request message conveying the execution result, wherein the update request message is encrypted prior to transmission using the pre-shared key.

An Attention (AT) Command may be used for at least one of: said requesting a SIM identifier of the SIM from a communication module of the host device; said supplying the random value to the communication module to initiate a SIM authentication procedure; and said transmitting the update data to the communication module.

An application programming interface provided by the communication module may be used for at least one of: said requesting a SIM identifier of the SIM from a communication module of the host device; said supplying the random value to the communication module to initiate a SIM authentication procedure; and said transmitting the update data to the communication module.

Deriving an agent identifier from the SIM identifier may comprise appending a prefix to the SIM identifier.

The deriving a pre-shared key may be triggered based on one of: (i) detecting a user input on the host device; (ii) receiving a session initiation message, via said network, from the SIM update server; and (iii) detecting an expiry of a predetermined time interval.

The SIM identifier may be one of: (i) an International Mobile Subscriber Identity associated with the SIM, (ii) an Integrated Circuit Card Identifier associated with the SIM, and (iii) a Mobile Station International Subscriber Directory Number associated with the SIM.

According to another aspect of the present disclosure there is provided a computer program product, the computer program product comprising code embodied on a non-transient computer-readable medium and configured so as when executed on a processor of the host device to perform the methods described herein.

According to another aspect of the present disclosure there is provided a device with a processor, said processor coupled to a communications module that is coupled to a subscriber identity module, SIM, associated with the device, the processor configured to: request a SIM identifier of the SIM via the communication module; receive the SIM identifier from the SIM via the communication module and derive an agent identifier from the SIM identifier; transmit the agent identifier and the SIM identifier over a network to a SIM update server; receive, via said network, a random value from the SIM update server; supply the random value to the SIM via the communication module to initiate a SIM authentication procedure, and in reply receive an authentication response from the SIM via the communication module; derive a pre-shared key from the authentication response; transmit an update request message over said network to the SIM update server, wherein the update request message comprises said agent identifier and is encrypted prior to transmission using the pre-shared key; receive an update response message, via said network, from the SIM update server, wherein the update response message comprises update data and is encrypted with the pre-shared key; following decryption of the update response message using the derived pre-shared key, transmit the update data to the communication module for relaying to the SIM for execution to update the SIM.

According to another aspect of the present disclosure there is provided a device with a processor, said processor coupled to a communications module that is coupled to a subscriber identity module (SIM) associated with the device, the processor configured to: request a SIM identifier of the SIM from the communication module; receive the SIM identifier from the communication module and derive an agent identifier from the SIM identifier; transmit the agent identifier and the SIM identifier over a network to the network entity; receiving, via said network, a random value from the network entity; supply the random value to the communication module to initiate a SIM authentication procedure, and in reply receive an authentication response from the communication module; and derive a shared key from the authentication response.

According to another aspect of the present disclosure there is provided a method of updating a subscriber identity module, SIM, on a host device, wherein the method is performed by a SIM update server and comprises: deriving a pre-shared key, said deriving comprising: receiving, from an agent on a host device, an agent identifier and a SIM identifier of the SIM transmitted from the host device over a network; generating a random value; supplying the random value and the SIM identifier of the SIM to an authentication entity, and in reply receive an authentication response from the authentication entity; and deriving the pre-shared key from the authentication response; storing the pre-shared key in association with the agent identifier in memory; transmitting the random value to the agent over the network receiving an update request message, via said network, from the agent on the host device, wherein the update request message comprises said agent identifier and is encrypted prior to transmission using the pre-shared key; and following decryption of the update request message using the pre-shared key; transmitting an update response message, via said network, to the host device, wherein the update response message comprises update data and is encrypted with the pre-shared key;

According to another aspect of the present disclosure there is provided a computer program product for updating a subscriber identity module (SIM) on a host device, the computer program product comprising code embodied on a non-transient computer-readable medium and configured so as when executed on a processor of a network entity (SIM update server) to perform the methods described herein.

According to another aspect of the present disclosure there is provided a SIM update server for updating a subscriber identity module, SIM, on a host device, the SIM update server comprising at least one processor configured to: receive, from an agent on a host device, an agent identifier transmitted from the host device over a network; generate a random value; supply the random value and a SIM identifier of the SIM to an authentication entity, and in reply receive an authentication response from the authentication entity; derive a pre-shared key from the authentication response; store the pre-shared key in association with the agent identifier in memory coupled to the SIM update server; receive an update request message, via said network, from the agent on the host device, the update request message comprising said agent identifier and is encrypted prior to transmission using the pre-shared key; and following decryption of the update request message using the pre-shared key, transmit an update response message, via said network, to the host device, wherein the update response message comprises update data and is encrypted with the pre-shared key.

The SIM update server may comprise multiple processors for updating the SIM on the host device, with the multiple processors distributed over a plurality of coupled elements (e.g. servers) in communication with one another (e.g. in a cloud architecture) in a manner known to those skilled in the art.

The authentication response may comprise a signed response and a cipher key.

The processor may be configured to derive the pre-shared key from the authentication response by using at least one of the signed response and the cipher key.

The processor may be configured to derive the pre-shared key by additionally using the random value.

The processor may be configured to derive the pre-shared key from the authentication response by concatenating the cipher key with itself to generate a concatenated result and applying a bitwise XOR operation on the concatenated result and the random value to derive the pre-shared key.

The update data may be encrypted with a symmetric cryptographic key stored in said memory.

The update request message may comprise the SIM identifier.

The skilled person will appreciate that processor control code to implement the above-described methods, devices, and network entities may run, for example, on a general purpose computer, a mobile computing or communications device, or on a digital signal processor (DSP) or across multiple processors. The code may be provided on a non-transitory physical data carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, or code for a hardware description language. As the skilled person will appreciate such code and/or data may be distributed between a plurality of coupled components in communication with one another.

The skilled person will similarly understand that where references are made to a server this may be to one or multiple servers; again functionality may be distributed across devices. Similarly some or all of the storage/processing functions may be provided in the cloud, which may be a public cloud or a private cloud. As used herein "cloud" means a system that may dynamically perform provisioning and provide computing resources such as a CPU, a memory, a storage, and network bandwidth, for example according to a demand on the network. The skilled person will also understand that server software may be implemented on a physical computer or computer system which is at the same time running client software.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which:

FIG. 1 illustrates a process flow of a known SIM update procedure;

6

Figure 6:
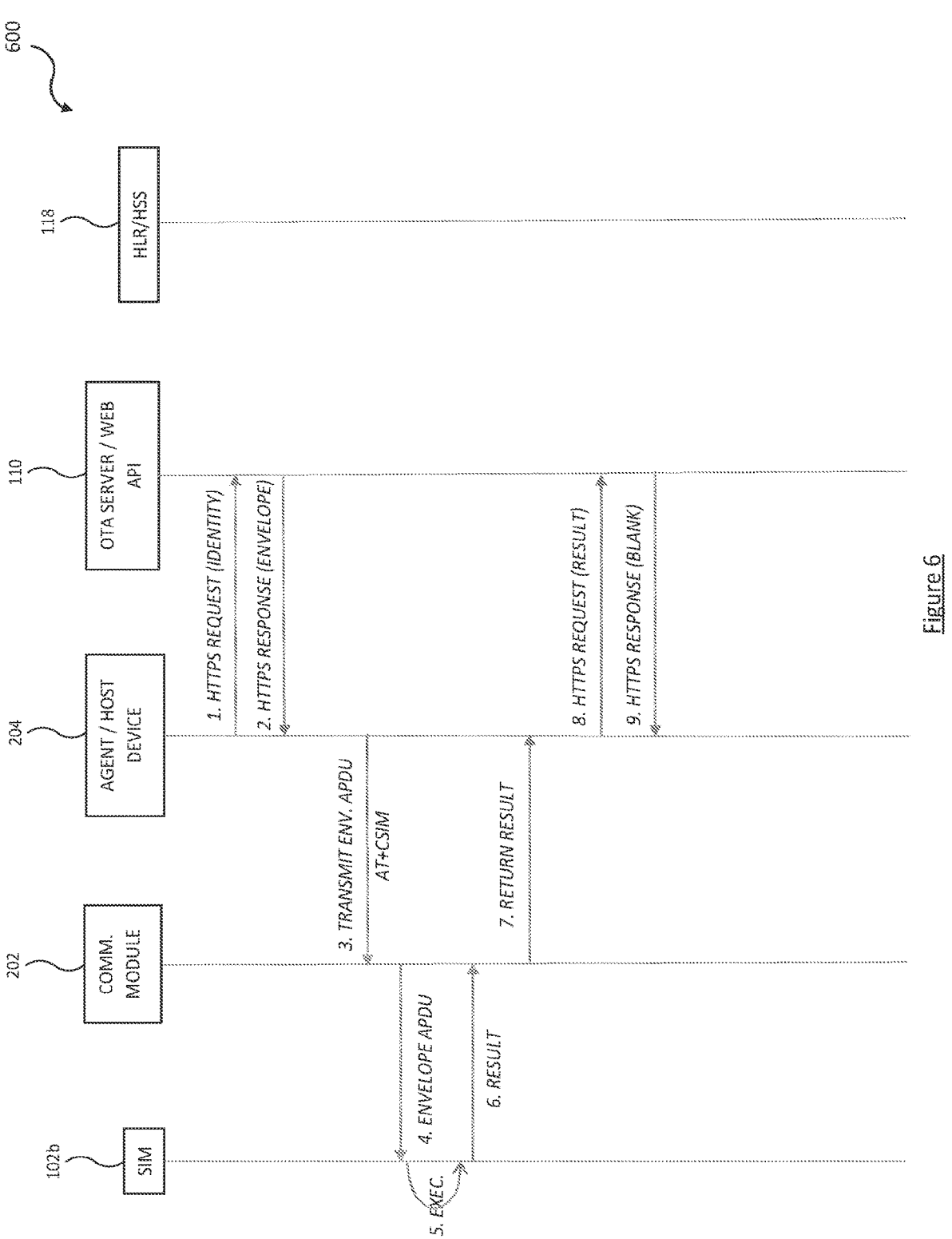
Figure 7:
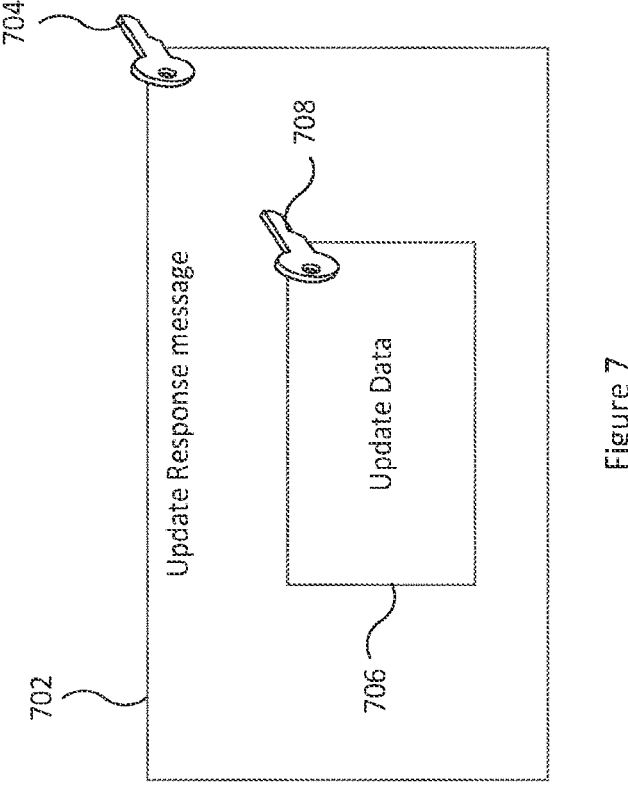

FIG. 6 illustrates a process flow of a SIM update procedure according to embodiments described herein; and FIG. 7 illustrates an update response message transmitted in the SIM update procedure.

DETAILED DESCRIPTION OF THE EMBODIMENTS

In this specification, the following definitions/examples will be used:

2G—second generation mobile telecommunications technology e.g. GSM;

3G—third generation of wireless mobile telecommunications technology e.g. EDGE;

4G—fourth generation, is the fourth generation of wireless mobile telecommunications technology e.g. LTE;

APDU—Application protocol data unit. This defines the basic command and response set which can be exchanged with a smart card through the ISO 7816 interface;

API—Application programming interface. This exposes special functions as provided for the interface;

BIP—Bearer Independent Protocol as defined in TS 102 223 allows a card application toolkit application on the UICC to establish a data channel with the terminal;

eUICC—embedded UICC (i.e. an embedded SIM which is usually soldered to the circuit board);

EDGE—Enhanced Data GSM Environment is a faster version the Global System for Mobile (GSM). EDGE is a 3G wireless communications standard;

GSM—GSM stands for Global System for Mobile Communications; GSM is a 2G wireless communications standard;

GPRS—General packet radio service;

HSPDA—High Speed Downlink Packet Access is one of two subprotocols of High Speed Packet Access (HSPA), a 3G mobile telecommunication network communication protocol;

HTTP OTA—Hypertext Transfer protocol over-the-air. A protocol to transfer management commands to the SIM card over IP services;

IEEE—Institute of Electrical and Electronics Engineers;

IMSI—The International Mobile Subscriber Identity is used to identify the user of a cellular network and is a unique identification associated with all cellular networks, may be defined, for example, as IMSI: XXX YY 1234567890 where
XXX: Denotes the MCC
YY: Denotes the MNC IP—is part of a longer abbreviation—TCP/IP;

iUICC—integrated UICC (i.e. a software SIM);

LTE—Long Term Evolution. LTE is a 4G wireless communications standard;

MCC: Mobile Country code;

MNC: Mobile Network code;

MFF2—Machine-to-machine form factor 2 defines one of the many forms that a SIM card can take, this one being one of the smallest in its embeddable version;

OTA—Over-The-Air. This covers any methodology of sending an update to the SIM (e.g. SMS OTA, HTTP OTA, etc.);

SCP80—Secure Channel Protocol 80, a standard for OTA via SMS defined by Global Platform;

SCP81—Secure Channel Protocol 81, a standard for OTA via IP networks defined by Global Platform. Also known as HTTP OTA;

SIM—Covers all variants of authentication tokens in all forms, e.g. UICC, eUICC, iUICC, SoftSIM;

SMS—Short Message Service also commonly referred to as a "text message";

SMS OTA—Short Message Service over-the-air. A protocol to transfer management commands to the SIM card over SMS;

TCP/IP stands for Transmission Control Protocol/Internet Protocol, which is a set of networking protocols that allows two or more computers to communicate;

UICC—The universal integrated-circuit card (UICC) is the smart card used in mobile terminals in GSM and UMTS networks;

Wi-Fi is a trademarked term for a wireless networking standard defined by IEEE 802.11x.

In the standard Hypertext Transfer Protocol Over-The-Air (HTTP OTA) (see FIG. 1), the Secure channel protocol 81 (SCP81) is implemented at the SIM and device level. It requires support for BIP in the host device (more specifically in the communication module of the host device). Support for BIP in the host device means to cater for some specific card application toolkit commands and events namely: OPEN CHANNEL, CHANNEL STATUS, CLOSE CHANNEL, SEND DATA, RECEIVE DATA and EVENT DATA AVAILABLE. This is described in ETSI TS 102 223: "Smart Cards; Card Application Toolkit (CAT)".

FIG. 1 shows a flow chart of a prior art HTTP OTA message protocol 100.

In a typical HTTP OTA session, in response to a communication module receiving a binary SMS message from an OTA server (step 1), at steps 2-6 the communication module opens a Transmission Control Protocol (TCP) channel to a designated server address (the I.P address is specified in the OPEN CHANNEL command). The device in turn forwards the higher-level protocol messages (requests), received from the SIM in the form of SEND DATA commands (at step 7), through the TCP channel towards the OTA server (at step 8). Those higher-level messages are actually wrapped in HTTPS packets by the SIM. The OTA server processes the requests and sends back the response messages (at step 9) which potentially contain Remote File Management (RFM) or Remote Application Management (RAM) commands to be executed by the SIM (at steps 10-13). In turn the SIM sends execution results to the communication module which relays the executions results to the OTA server (step 15) in the form of a new request until the OTA server sends an empty response (at step 16). In response to processing the empty response (steps 17-19), the SIM instructs the communication module to close the TCP channel (step 20). The communication module then communicates with the OTA server to close the TCP channel (steps 21-22) and informs the SIM of the TCP channel closure (step 23).

The higher-level messages which are exchanged through the TCP channel are wrapped in HTTP packets which are themselves encapsulated in TLS protocol packets. The specific TLS protocol version used here is a called TLS Pre-Shared Key (PSK) in which a pre-shared secret key which is known by the OTA server and the SIM, is used to encrypt/decrypt the communication packets.

Figure 2:
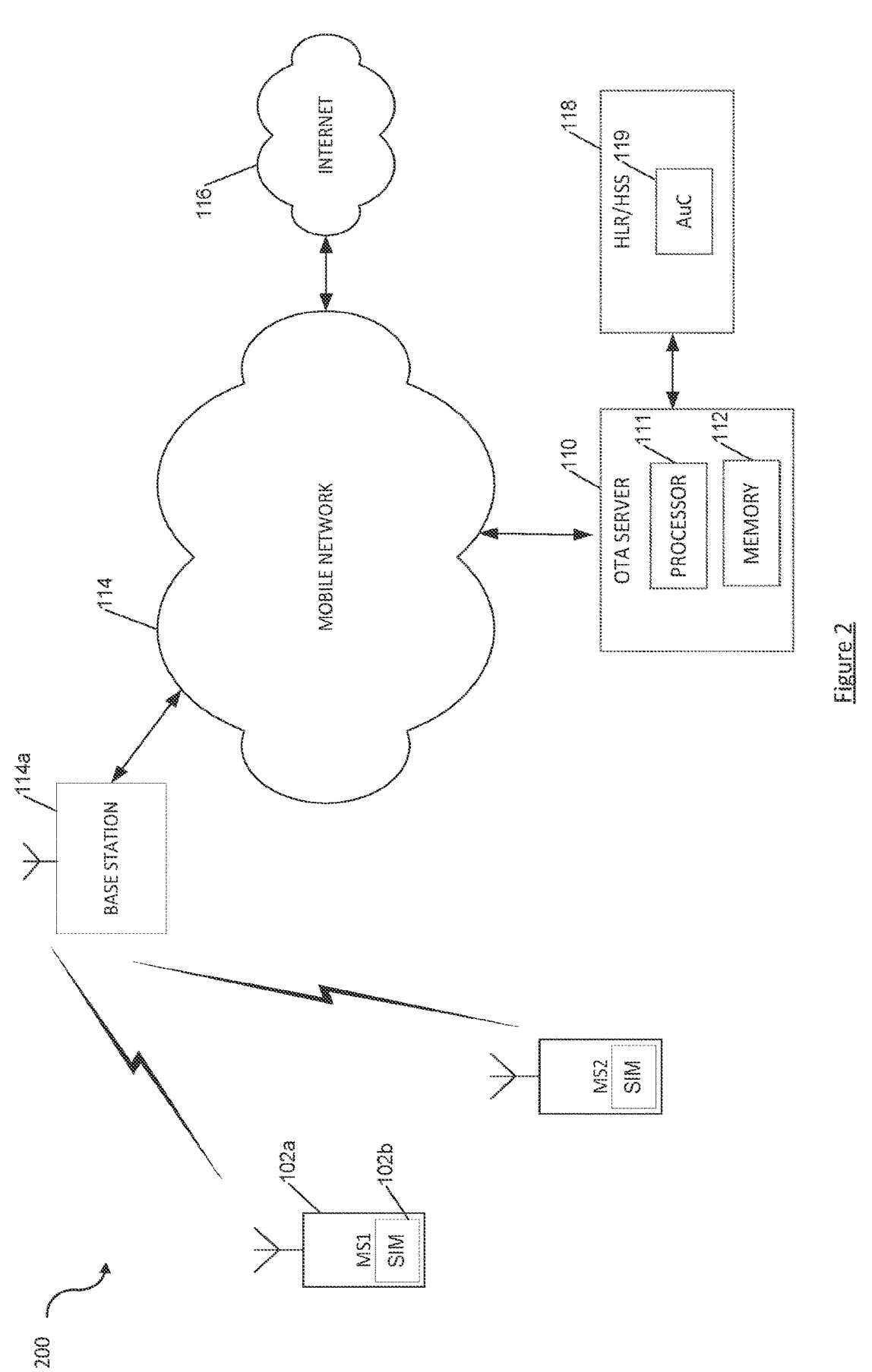
FIG. 2 shows a block diagram of a system for updating SIMs according to embodiments described herein.

Referring now to FIG. 2, this shows a block diagram of a system 200 for updating SIMs according to embodiments described herein. The system comprises an IP network 114 comprising conventional network elements and including a plurality of base stations 114a (of which only one is shown for illustration purposes) for communicating with host devices 102a. A host device 102a is a computing device capable of transmitting data to, and received information from, the network 114. The host device 102a may take the form of, for example, a laptop computer, tablet style computer, or mobile phone (which may be referred to as a "smart phone"). In the example of FIG. 2, the host device 102a is shown as a mobile device (and is thus referred to herein as a mobile station) however this is merely an example.

Each of the mobile stations 102a communicate with network 114 via a wireless data communication link and have an associated SIM 102b. In the illustrated example, the network 114 is also coupled to the Internet 116.

The system 200 also includes a SIM update server 110 (otherwise referred to herein as a network entity) for updating a SIM. The SIM update server 110 is configured to send over-the-air (OTA) updates to the SIM and is therefore also referred to herein as an OTA server. As illustrated this is shown as a separate element but in practice this may be implemented as an additional software component running on an existing network device or server. The SIM update server 110 includes a processor 111 and memory 112 storing code to derive a pre-shared key, receive an update request message from a host device, and transmit update data to the host device as described in more detail later. The SIM update server 110 is coupled to a Home Location Register (HLR) 118, otherwise referred to as a Home Subscriber Server (HSS). The HLR terminology is typically used when the mobile network 114 is a 2G or 3G network and the HSS terminology is typically used when the mobile network 114 is a 4G LTE network.

The HLR/HSS 118 is a database used for the storage and management information of every subscriber that is authorized to use the network 114. The HLR stores subscriber information which may include, for each subscriber, the International Mobile Subscriber Identity (IMSI), service subscription information, location information, service restrictions etc. of the subscriber. The HLR/HSS 118 comprises, or is coupled to, an Authentication Centre (AuC) 119. The AuC 119 provides authentication of each subscriber. The AuC 119 comprises a database storing, for each subscriber, a shared key Ki for authentication of the subscriber's SIM. The AuC 119 may store a plurality of shared keys Ki each in associated with a respective IMSI (or other SIM identifier).

Whilst FIG. 2 illustrates one example system whereby the network 114 is a mobile (cellular) communications network, this is merely an example. For example, embodiments extend to implementing the OTA update using the methods described herein whereby a host device is coupled to the Internet or the IP network 116 via a WiFi link over a WiFi network. That is, in embodiments, an OTA update can be achieved through any data connection (e.g. WiFi, LAN etc.) even if the SIM 102b cannot authenticate on a cellular network (for example during roaming attempts).

Figure 3:
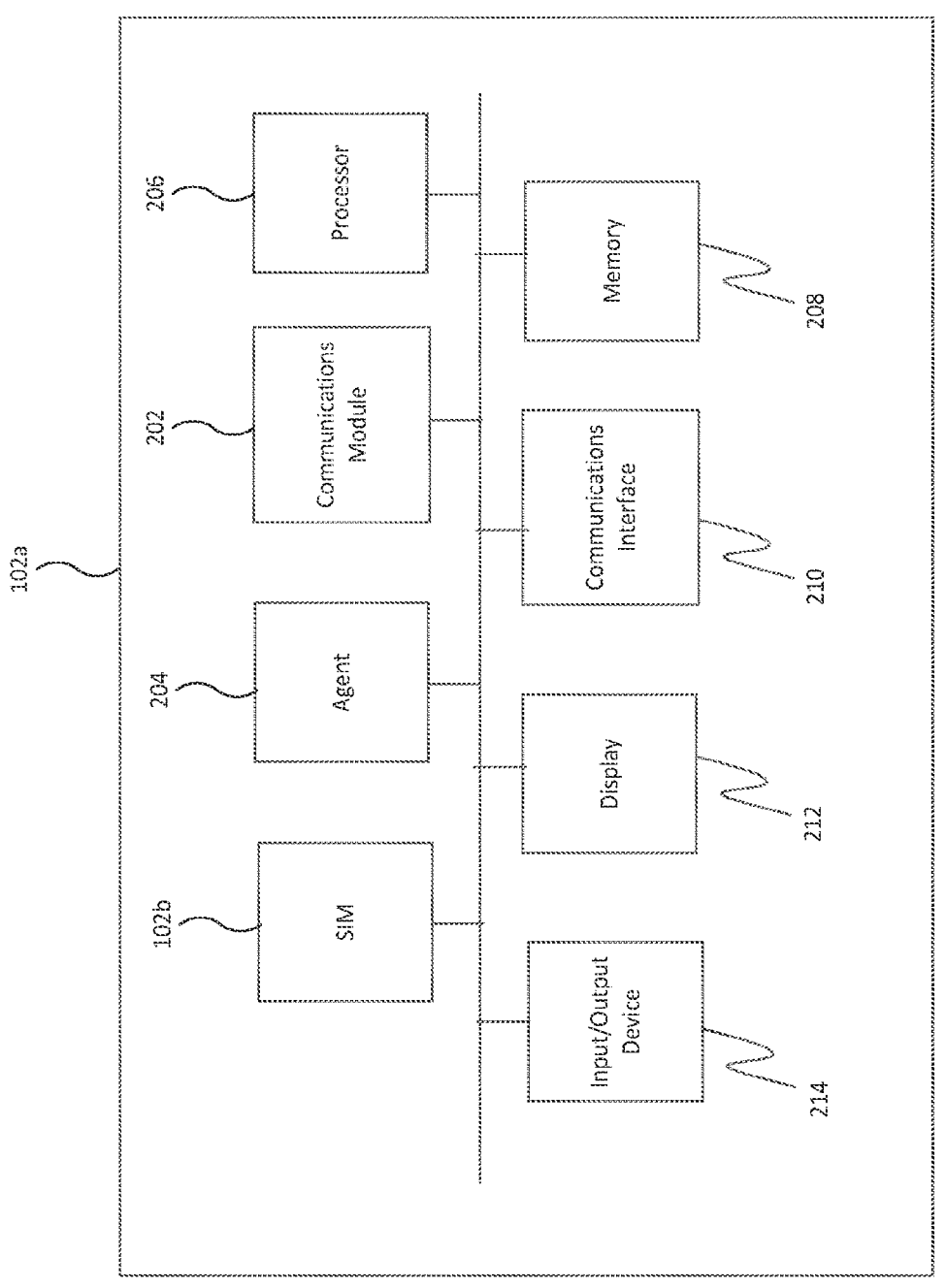
FIG. 3 shows a block diagram of a mobile station for use with the system of FIG. 2.

FIG. 3 shows a block diagram of an exemplary mobile station 102a. The connections shown in FIG. 3 between the various components of the mobile station 102a are merely an example.

As shown in FIG. 3 the mobile station 102a comprises a SIM 102b. As the skilled person will be aware, a "SIM" used herein may comprise a SIM card or a so-called eSIM (a module which may be embedded in a device), or a so-called softSIM or virtual SIM (a software SIM which may be stored, for example in a module of a device such as a communication module 202, and optionally downloaded over the air) or so-called secure element. The technology we describe is also applicable to SIMs other than SIM cards.

Thus, a SIM may be embodied in, for example, a UICC (Universal Integrated Circuit Card), eUICC, iUICC, and so forth.

A communications module 202 acts as an intermediary for communications between the SIM 102b and an agent 204 (described in more detail below). The communications module 202 is a modem e.g. an HSPDA modem. In embodiments described herein, the communications module 202 may not support the Bearer Independent Protocol (BIP), however the agent 204 enables a form of HTTP OTA without requiring support for BIP in the communication module and therefore allows SIM cards inside of legacy communication modules (which do not support BIP) to be able to securely exchange RFM and RAM messages over IP networks.

The communications module 202 may be external to the mobile station 102a in that it is a separate unit housed in a separate casing, but which is connected or connectable to a processor 206 of the mobile station 102a by means of a wired or wireless connection (as well as being removable or being able to be disconnected from the mobile station 102a). For example, the communications module 202 may take the form of a dongle for plugging into the mobile station 102a. As a mere example the communications module may take the form of the MS2131 USB-stick by Huawei. As an alternative, the communications module 202 may be internal to the mobile station 102a, e.g. taking the form of a wireless module in the mobile station 102a. For example, both the communications module 202 and host processor 206 may be housed within the same casing of the mobile station 102a.

The mobile station 102a further comprises an agent 204 (an update handler) which is configured to communicate with the communications module 202. The agent 204 is further configured to communicate with the OTA server 110 via the network 114. That is, the handling of HTTP over TLS is delegated to the agent 214 on the mobile station 102a.

The functionality of the agent 204 may be implemented in code (software) stored on a memory (e.g. memory 208) comprising one or more storage media, and arranged for execution on the processor 206 comprising one or more processing units. The code is configured so as when fetched from the memory 208 and executed on the processor 206 to perform operations in line with embodiments discussed below. An implementation of the software agent 204 would typically consist of a piece of code to be executed on an Operating System (OS) of the mobile station 102a. The OS (e.g. Windows™, Mac OS™ and Linux™) is executed on the processor 206. The agent 204 can come, for example, in the form of a command line tool which can trigger a communication session. Alternatively, it is not excluded that some or all of the functionality of the agent 204 is implemented in dedicated hardware circuitry, or configurable hardware circuitry like an FPGA.

In one embodiment, the agent 204 is in the form of an agent application which is able to be downloaded by a customer onto their computing device. The agent application is then able to trigger a remote update in places where the SMS OTA is not available or in the case that the payload on SMS would require too many concatenated SMS messages (thereby increasing the risk of failure). In one example scenario, a user living in a remote area has a SIM which is not connecting to the local mobile network, the user can be directed to connect the communication module 202 to their computing device and download the agent application 204 onto their computing device. In accordance with functionality described in more detail below the agent application 204 is able to receive new SIM credentials as updates via a connection to the OTA server 110 via a WiFi internet link which can be then be used to reconfigure the SIM in order to connect to the local mobile network.

The agent 204 is configured to communicate with the OTA server 110 using a communications interface 210 of the mobile station 102a. The communications interface 210 may comprise a wireless transceiver to enable communications between the agent 204 and the network 114.

The mobile station 102a may further comprise a display 212 such as a screen or touch screen. The mobile station 102a may comprise at least one input device 214 for receiving user inputs from a user of the mobile station 102a e.g. a keypad, a microphone, a camera, and touch screen; and/or at least one output device 214 e.g. a speaker.

Figure 4:
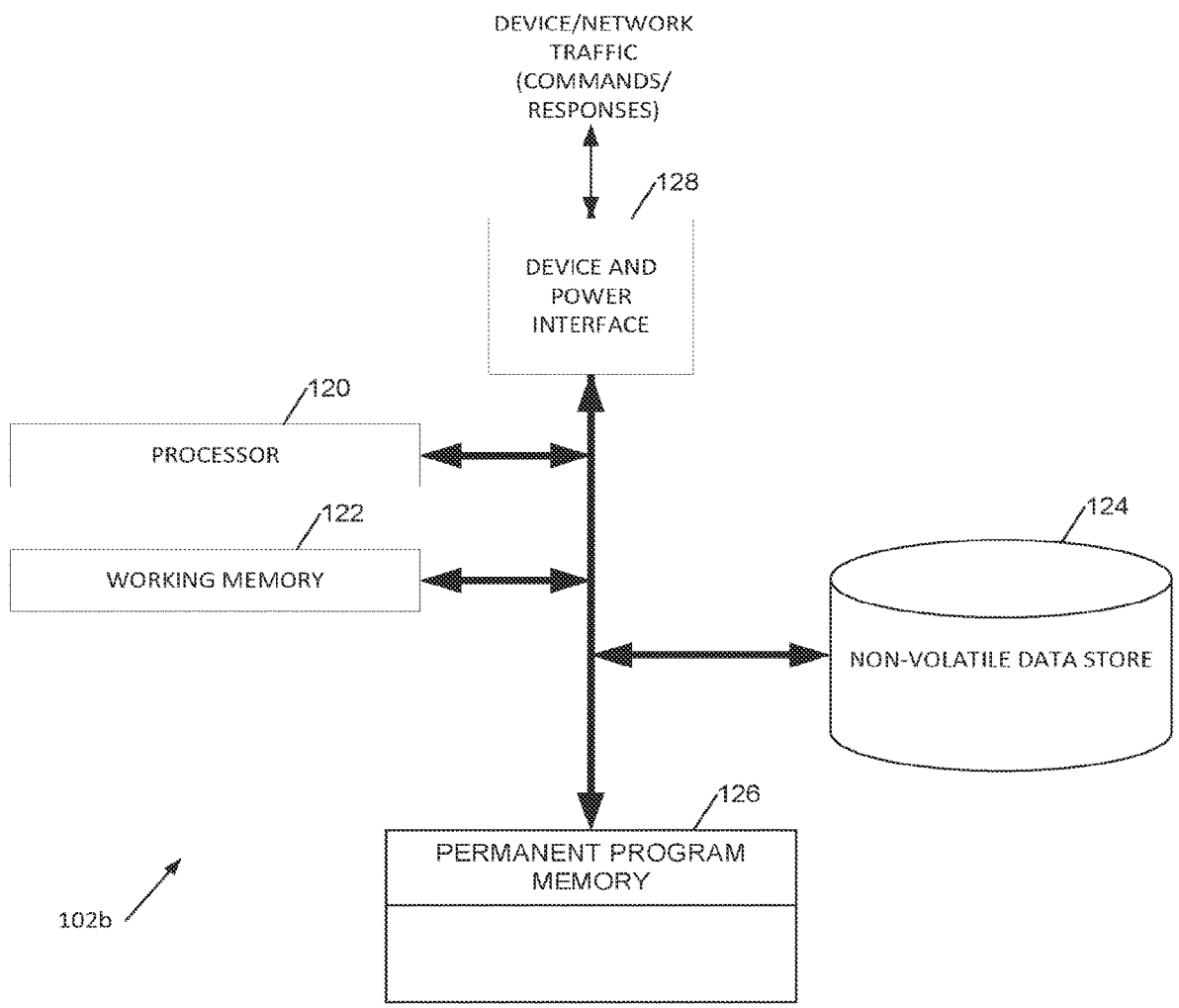
FIG. 4 shows a block diagram of a SIM for use with the system of FIG. 2.

FIG. 4 shows a block diagram of an exemplary SIM card of a SIM 102b. The SIM card comprises a processor 120 coupled to working memory 122, a non-volatile data store 124, such as EEPROM, and permanent program memory 126 such as ROM. The SIM card also has an interface 128 to receive power and to accept commands from and provide responses to the communications module 202. The permanent program memory 126 may store network/device interface code, an operating system for example comprising Java Card, and typically though not essentially a Sim Application Toolkit (STK). The non-volatile data store 124 typically stores user phone directory information, settings data, software patches and the like. The non-volatile data store 124 may store the shared key Ki and the IMSI associated with the SIM 102b. The authentication key Ki is "shared" in that it is stored by both the SIM 102b and the AuC 119. Typically, the IMSI is publicly accessible whereas the shared key Ki is stored in protected manner.

Further code to perform SIM operations described below with reference to FIGS. 5 and 6 may reside in permanent program memory 126 but alternatively it could partly or wholly be stored in non-volatile data store 124.

As previously described, although FIG. 4 shows SIM 102b as a SIM card its functions could equally be implemented as an eSIM or a softSIM.

Figure 5:
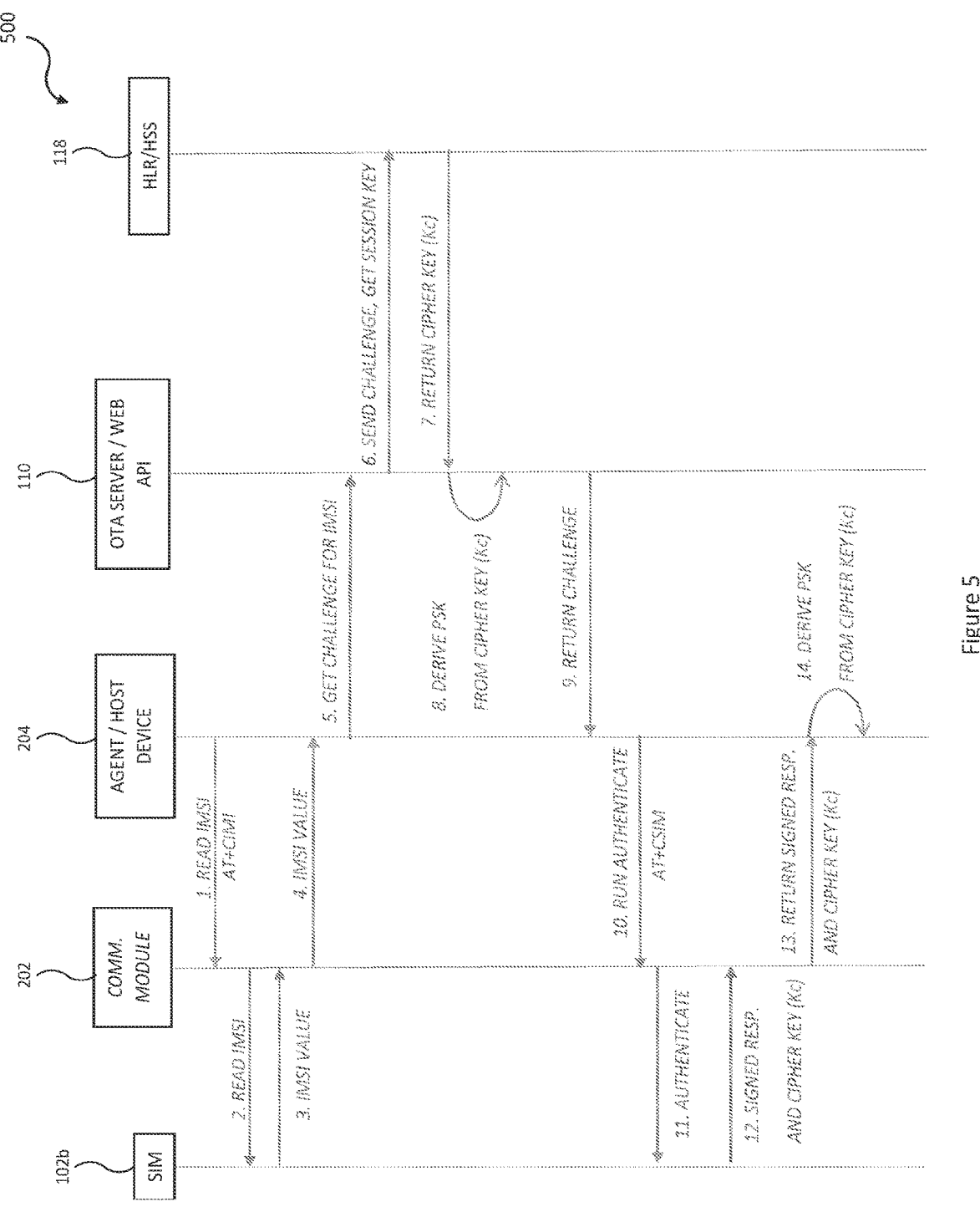
FIG. 5 illustrates a process flow of a procedure to derive a pre-shared key.

We now turn to FIG. 5 which illustrates a process 500 of a procedure to derive a pre-shared key (PSK). The pre-shared key (PSK) is a cryptographic key and the process 500 is carried out at the beginning of a communication session so that both the mobile station 102a and OTA server 110 mutually derive the pre-shared key for use in encrypting communications between the mobile station 102a and OTA server 110. That is, the agent 204 and OTA server 110 share the key (PSK) that they have mutually derived.

At step 1 the agent 204 transmits a request for an identifier of the SIM 102b to the communication module 202. As shown in FIG. 5, the requested SIM identifier may be the IMSI associated with SIM 102b or the ICCID, MSISDN or any other identifier associated with SIM 102b that would be known to persons skilled in the art.

Step 1 may be achieved, for example, by the agent 204 sending an ATtention (AT) Command to a serial interface of the communication module 202. An "AT Command" is a known message format for serial communication with modems defined in 3GPP TS 07.007. For instance, the "AT+CIMI" command can be used at step 1 to retrieve the identifier of the SIM 102b.

An alternative way that step 1 can be achieved is by using an Application Programming Interface (API) provided by the communication module 202 such that the agent 204 can transmit an API call to the communication module 202 to request the SIM identifier.

Step 1 may be triggered by a user of the mobile station 102a providing an input via an input device 214 of the mobile station 102*a* (e.g. by making a selection in a graphical user interface displayed on the display 212). Alternatively, or additionally, a mobile network operator (MNO) may trigger the communication session by transmitting a session initiation message from the OTA server to the mobile station 102*a* over the network 114. In this embodiment, the agent 204 should be programmed to support the necessary triggers, such as SMS processing or some form of network service. Alternatively, or additionally, step 1 may be triggered based on the agent 204 detecting the expiry of a predetermined time interval (e.g. by monitoring an internal timer) such that the process 500 is performed on a periodic basis.

In response to receiving the request from the agent 204, the communication module 202 requests the SIM identifier from the SIM 102*b* at step 2. This may be performed by executing standard application protocol data unit (ADPU) commands.

At step 3 the SIM 102*b* provides the requested SIM identifier to the communication module 202, the communication module 202 then returns the SIM identifier to the agent 204 at step 4.

In response to receiving the SIM identifier, the agent 204 is configured to generate an agent identifier from the SIM identifier. The agent identifier is a unique string that identifies the agent 204. In one example, the agent 204 derives the agent identifier by appending the prefix "agent" to the SIM identifier. It will be appreciated that this is merely an example to illustrate the concept and alternative methods to derive the agent identifier using the SIM identifier may be used.

At step 5 the agent 204 transmits the agent identifier and the SIM identifier to the OTA server 110 over the network 114. At step 5 the agent may trigger an API on the IP network 114 (e.g. a Web API), with the agent identifier as a parameter. This API is offered through a secure channel, e.g. HTTPS. The transmission of the agent identifier to the OTA server 110 at step 5 acts to request a challenge, described in more detail below.

In response to receiving the agent identifier, at step 6 the OTA server generates a random value (RAND), which may for example be 128 bits in length, otherwise referred to herein as a "challenge" and transmits the challenge (RAND) and the SIM identifier to the AuC 119.

The AuC 119 retrieves the shared key Ki stored in association with the SIM identifier and generates a signed response (SRES) using a first authentication algorithm (e.g. A3 encryption algorithm) that takes the shared key Ki and challenge (RAND) as inputs, and a cipher key (Kc) using a second authentication algorithm (e.g. A8 encryption algorithm) that also takes the shared key Ki and challenge (RAND) as inputs.

At step 7 the OTA server 110 receives the signed response (SRES) and the cipher key (Kc) from the HLR/HSS 118.

At step 8, the OTA server 110 derives a pre-shared key (PSK), which may be 128 bits in length, using at least one of the signed response (SRES) and the cipher key (Kc). Optionally the challenge (RAND) may additionally be used to derive the pre-shared key (PSK). One example of how the pre-shared key (PSK) may be derived is by concatenating the cipher key (Kc) with itself and then applying a bitwise XOR operation of the result with the challenge (RAND) as follows:

$$PSK = CONCATENATE\ (Kc,\ Kc)\ XOR\ RAND.$$

It will be appreciated that this is merely an example to illustrate the concept and alternative methods to derive the pre-shared key (PSK) may be used.

The pre-shared key (PSK) can be temporary in nature, meaning that it can be forgotten after a communication session between the mobile station 102*a* and the OTA server 110 has taken place with it.

Once the OTA server 110 has derived the pre-shared key (PSK) it associates the pre-shared key (PSK) with the agent identifier received at step 5 and stores the associated pre-shared key (PSK) and agent identifier in internal memory on the OTA server 110 (it will be appreciated that the associated pre-shared key (PSK) and agent identifier may alternatively be stored in memory that is external to the OTA server 110). This enables the OTA server 110 to know that it is to use the pre-shared key (PSK) for encryption of communications to the agent 204 on mobile station 102*a*.

At step 9 the OTA server 110 transmits the challenge (RAND) over the network 114 to the agent 204 on mobile station 102*a*.

At step 10, the agent 204 supplies the random value to the communication module 202 to initiate a SIM authentication procedure, and in reply receives an authentication response from the communication module 202 (at step 13) as described in more detail below.

At step 10, the agent 204 may transmit an AT command to the communication module 202. In particular, the challenge (RAND) may be used as seed by the agent 204 to invoke a command in the SIM (AUTHENTICATE command) with this random value as a parameter. One way to invoke the AUTHENTICATE APDU at the SIM level is to use the AT+CSIM command and collect the response APDU from the AT+CSIM response (step 13) to the AT command. An alternative way that step 10 can be achieved is by using an API provided by the communication module 202 such that the agent 204 can transmit an API call to the communication module 202 to initiate the SIM authentication procedure.

During the SIM authentication procedure, the communication module 202 supplies the challenge (RAND) to the SIM 102*b* at step 11 e.g. by executing the Authenticate APDU command received at step 10.

At step 12, the SIM 102*b* retrieves the shared key Ki from the non-volatile data store 124 and generates a signed response (SRES) using a first authentication algorithm (e.g. A3 encryption algorithm) that takes the shared key Ki and challenge (RAND) as inputs, and a cipher key (Kc) using a second authentication algorithm (e.g. A8 encryption algorithm) that also takes the shared key Ki and challenge (RAND) as inputs. The SIM 102*b* supplies the signed response (SRES) and cipher key (Kc) to the communication module 202.

At step 13, the communication module 202 supplies the signed response (SRES) and cipher key (Kc) to the agent 204 in an authentication response.

At step 14, the agent 204 derives the pre-shared key (PSK) in the same manner as in step 8 (implemented by the OTA server).

Thus at the end of the process 500 both the agent 204 and OTA server 110 have derived the TLS encryption key (PSK). The pre-shared key (PSK) is used to encrypt/decrypt the communication packets transmitted between the agent 204 and OTA server 110 as described in more detail below with reference to FIG. 6.

FIG. 6 illustrates a process 600 of a SIM update procedure which is performed once the pre-shared key derivation procedure 500 has completed.

Prior to step 1, the agent 204 opens a TLS channel with the OTA server 110. The opening of a TLS channel is referred to in the art as a "TLS Handshake" and is described in RFC 4279. During the TLS Handshake a series of messages are exchanged between the agent 204 and the OTA server 110. These messages are known in the art and therefore are not described in detail herein. During the TLS Handshake procedure, the agent 204 informs the OTA server 110 of the key (the pre-shared key (PSK)) to be used for encrypting/decrypting the communication packets transmitted between the agent 204 and OTA server 110. In particular, the agent 204 transmits a message (e.g. a "Client Key Exchange" message), including the agent identifier as the "PSK identity", to the OTA server 110. In response, the OTA server 110 queries its associated memory 112 using the agent identifier and retrieves the pre-shared key (PSK) stored in association with the agent identifier.

The host device 102a may comprise a TLS/PSK software module. The agent 204 may comprise the TLS/PSK software module (part of the functionality of the agent 204) or alternatively the TLS/PSK software module may be a separate module to the agent 204 and comprise program code sored in memory 208 that performs specified tasks when executed on processor 206.

The agent 204 supplies the derived PSK to the TLS/PSK software module. The TLS/PSK software module is configured to derive session keys from the PSK that are used by the TLS/PSK software module of agent 204 for the encryption of data transmitted from the agent 204 to the OTA server 110, and the decryption of data sent to the agent from the OTA server 110. The TLS/PSK module on the host device 102a is responsible for decrypting the HTTP messages and handing them over to the agent 204.

The operation of the TLS/PSK software module is known to persons skilled in the art and is documented in RFC 4279 and in RFC 2246. Generally, the TLS/PSK software module derives a "pre-master secret" from the PSK (this is described in RFC 4279-Section 2). The pre-master secret is encrypted and exchanged in the TLS handshake. The "pre-master secret" is used to derive a "master secret" (this is described in RFC 2246—Section 8.1). The TLS/PSK software module passes the master key and other pieces of data from the handshake into a pseudo-random function (PRF) to generate the session keys (this is described in RFC 2246—Sections 5 and 6.3).

The session keys comprise a "client write encryption key" used by the TLS/PSK software module of agent 204 for the encryption of data transmitted from the agent 204 to the OTA server 110 (and used by the TLS/PSK software module of the OTA server 110 to decrypt data), and a "server write encryption key" used by the TLS/PSK software module of the OTA server 110 for the encryption of data transmitted from the OTA server 110 to the agent 204 (and used by the TLS/PSK software module of agent 204 to decrypt data). It will be appreciated from the above that these session keys are derived from the PSK.

The OTA server 110 may also comprise a TLS/PSK software module which is configured to derive the session keys in the same manner as the agent 204 described above.

At step 1, the agent 204 transmits an update request message to the OTA server 110 via the TLS channel. The update request message comprises the agent identifier (generated by the agent 204 in procedure 500) and may additionally comprise the SIM identifier associated with the SIM 102b. The update request message is encrypted using the pre-shared key (PSK) derived during procedure 500. That is, the update request message is encrypted by the TLS/PSK software module of agent 204 with the session key (client write encryption key) that is derived from the PSK.

As shown in FIG. 6, the update request message may be sent as a first HTTP request comprising the agent identifier as a parameter (conformingly to the SCP81 protocol). That is, the messages which are exchanged through the TLS channel may be wrapped in HTTP packets which are themselves encapsulated in TLS protocol packets.

In response to receiving the update request message, the OTA server 110 decrypts the update request message using the pre-shared key (PSK). That is, the TLS/PSK software module of the OTA server 110 decrypts the update request message with the session key (client write encryption key) that is derived from the PSK.

At step 2, the OTA server 110 transmits an update response message to the agent 204 over the TLS channel. The update response message is encrypted using the pre-shared key (PSK) prior to transmission. That is, the update response message is encrypted by the TLS/PSK software module of the OTA server 110 with the session key (server write encryption key) that is derived from the PSK.

The update response message comprises update data. The update data may be stored in memory 112 and may be associated with the SIM 102b i.e. be pre-designated as being for delivery to the SIM 102b. The update data may comprise at least one envelope APDU. The at least one envelope APDU may comprise RFM and/or RAM commands to be executed by SIM 102b. The at least one envelope APDU is encrypted by the OTA server 110 using a symmetric OTA key and thus forms Secure Envelope APDU(s). The symmetric OTA key is installed on the SIM 102b at manufacture and provisioned on the OTA server 110. The symmetric OTA key may correspond to the Ciphering Key Identifier (Klc) specified in standard ETSI TS 102 225.

FIG. 7 illustrates an update response message 702. As shown in FIG. 7, the update response message 702 is encrypted using the session key (server write encryption key) 704 that is derived from the PSK. The update response message 702 comprises update data 706 which is encrypted by the OTA server 110 using a symmetric OTA key 708.

Referring back to the process 600 shown in FIG. 6, upon receiving the update response message the update response message is decrypted using the pre-shared key derived during procedure 500. That is, the TLS/PSK software module of agent 204 decrypts the update response message with the session key (server write encryption key) that is derived from the PSK.

At step 3, the agent 204 supplies the encrypted update data to the communication module 204. At step 3, the agent 204 may transmit an AT command to the communication module 202 to supply the encrypted update data to the communication module 204. In particular, the AT+CSIM command may be used. An alternative way that step 3 can be achieved is by using an API provided by the communication module 202 such that the agent 204 can transmit an API call to the communication module 202 to supply the encrypted update data to the communication module 204.

At step 4, the communication module 204 supplies the encrypted update data to the SIM 102b.

In response to receiving the encrypted update data, the SIM 102b decrypts the encrypted update data using the symmetric OTA key 708 and at step 5 executes the update data to update the SIM 102b. The update performed on the SIM 102b based on the received update data may comprise installing new data onto the SIM 102b (e.g. installing a new application such as a Javacard applet), updating data previously installed on the SIM 102*b*, and/or modifying parameter values stored on the SIM 102*b*.

At step 6, results of the execution of the update data are transmitted from the SIM 102*b* to the communication module 202. At step 7, the communication module 202 relays the execution results to the agent 204.

At step 8, the agent 204 transmits a further update request message over the network 114 to the OTA server 110, the update request message conveys the results of the execution of the update data. As noted above, the update request message is encrypted using the pre-shared key (PSK) prior to transmission. That is, the update request message is encrypted with the session key (client write encryption key) that is derived from the PSK.

In response to receiving the further update request message from the agent 204, the OTA server 110 is configured to determine if there is further update data to be sent to the agent 204.

If there is further update data to be sent to the agent 204, the process 600 proceeds back to step 2 (in the process 600) where a further update response message is transmitted to the agent 204 over the TLS channel.

Collecting data (e.g. reading SIM parameters) may be performed in the process 600. In particular, a first update response message transmitted by the OTA server 110 at step 2 may comprise a read command which is relayed to the SIM 102*b* for execution and thus the further update request message returned to the OTA server 110 at step 8 may comprise data read results (e.g. SIM parameter values). The data read results may be used by the OTA server 110 in determining update data to be transmitted in a further update response message transmitted by the OTA server 110 to the agent 204 when the process 600 loops backs to step 2.

If there is no further update data to be sent to the agent 204, the process 600 proceeds to step 9 where a message is transmitted from the OTA server 110 to the agent 204 indicating that there is no further update data. The message transmitted at step 9 may be a blank HTTP response (e.g. HTTP response code 200).

Upon receiving the message indicating that there is no further update data, the communication session can be successfully terminated.

It can be seen from the processes 500 and 600 described above that the agent 204 provides support for an HTTP OTA mechanism in legacy SIM-enabled communication modules (even in 2G modules), and provides HTTP OTA without the need for SMS support on the host device 102*a*.

The APDUs can potentially be examined using a SIM communication logging device (tracer) inspecting the mobile station 102*a*. Therefore to address this, as noted above, the update data APDUs are wrapped in Secure Envelope APDUs, in the same way as in SMS OTA protocol (SCP80). The SMS OTA keys are only known by the OTA server 110 and the SIM 102*b* and therefore the RFM/RAM messages are protected from end to end to provide secure transmission of the update data to the SIM 102*b*. Moreover, since the endpoint of the HTTPS Tunnel is the agent 204 instead of the SIM 102*b*, the APDUs are considered to be provided externally for execution and therefore would not be executed successfully without a proper authorization system. The fact of wrapping inside of secure envelopes provides for this required authorization.

The communication protocol with the OTA Server 110 described above with reference to FIGS. 5 and 6 differs from the SCP 81 protocol (described above) in that the handling of HTTP over TLS is delegated to the software agent 204 on the host device 102*a* and the SIM 102*b* is used as secure element to derive the TLS encryption key (PSK).

In embodiments described herein, the time taken for an OTA update can be reduced because the host hardware (e.g. processing and/or memory resources) on the mobile station 102*a* is typically more resource rich compared to SIM hardware. For example, to process HTTPS messages is computationally intensive and the hardware available on the host device provides faster processing of these communications.

Aspects of the present disclosure are described below with reference to the following clauses;

C1. A method of updating a subscriber identity module (SIM) on a host device, wherein the method is performed by an agent on the host device and comprises:

b. deriving a pre-shared key, said deriving comprising:

i. requesting a SIM identifier of the SIM from a communication module of the host device;

ii. receiving the SIM identifier from the communication module and deriving an agent identifier from the SIM identifier;

iii. transmitting the agent identifier and the SIM identifier over a network to a network entity;

iv. receiving, via said network, a random value from the network entity;

v. supplying the random value to the communication module to initiate a SIM authentication procedure, and in reply receive an authentication response from the communication module; and vi. deriving the pre-shared key from the authentication response;

c. transmitting an update request message over said network to the network entity, wherein the update request message comprises said agent identifier and is encrypted prior to transmission using the pre-shared key;

d. receiving an update response message, via said network, from the network entity, wherein the update response message comprises update data and is encrypted with the pre-shared key; and e. decrypting the update response message using the derived pre-shared key, and transmitting the update data to the communication module for relaying to the SIM for execution to update the SIM.

C2. The method of clause C1, wherein the authentication response comprises a signed response and a cipher key.

C3. The method of clause C2, wherein deriving the pre-shared key from the authentication response comprises using at least one of the signed response and the cipher key to derive the pre-shared key.

C4. The method clause C3, wherein deriving the pre-shared key from the authentication response comprises using the random value to derive the pre-shared key.

C5. The method clause C4, wherein deriving the pre-shared key from the authentication response comprises concatenating the cipher key with itself to generate a concatenated result and applying a bitwise XOR operation on the concatenated result and the random value to derive the pre-shared key.

C6. The method of any preceding clause, wherein the update data is encrypted with a symmetric cryptographic key stored by the SIM.

C7. The method of any preceding clause, wherein the update request message comprises said SIM identifier.

C8. The method of any preceding clause, further comprising, in response to transmitting the update data to the communication module:

f. receiving an execution result from the SIM via the communications module; and g. transmitting a further update request message over said network to the network entity, the update request message conveying the execution result, wherein the update request message is encrypted prior to transmission using the pre-shared key.

C9. The method of any preceding clause, wherein an Attention (AT) Command is used for at least one of:

h. said requesting a SIM identifier of the SIM from a communication module of the host device;

i. said supplying the random value to the communication module to initiate a SIM authentication procedure; and j. said transmitting the update data to the communication module.

C10. The method of any preceding clause, wherein an application programming interface provided by the communication module is used for at least one of:

k. said requesting a SIM identifier of the SIM from a communication module of the host device;

l. said supplying the random value to the communication module to initiate a SIM authentication procedure; and m. said transmitting the update data to the communication module.

C11. The method of any preceding clause, wherein deriving an agent identifier from the SIM identifier comprises appending a prefix to the SIM identifier.

C12. The method of any preceding clause, wherein said deriving a pre-shared key is triggered based on one of: (i) detecting a user input on the host device; (ii) receiving a session initiation message, via said network, from the network entity; and (iii) detecting an expiry of a predetermined time interval.

C13. The method of any preceding clause, wherein the SIM identifier is one of: (i) an International Mobile Subscriber Identity associated with the SIM, (ii) an Integrated Circuit Card Identifier associated with the SIM, and (iii) a Mobile Station International Subscriber Directory Number associated with the SIM.

C14. A method of updating a subscriber identity module (SIM) on a host device, wherein the method is performed by a network entity and comprises:

n. deriving a pre-shared key, said deriving comprising:

i. receiving, from a host device, an agent identifier and a SIM identifier of the SIM transmitted from the host device over a network;

ii. generating a random value;

iii. supplying the random value and the SIM identifier of the SIM to an authentication entity, and in reply receive an authentication response from the authentication entity; and iv. deriving the pre-shared key from the authentication response;

o. storing the pre-shared key in association with the agent identifier in memory;

p. receiving an update request message, via said network, from the host device, wherein the update request message comprises said agent identifier and is encrypted prior to transmission using the pre-shared key; and q. transmitting an update response message, via said network, to the host device, wherein the update response message comprises update data and is encrypted with the pre-shared key.

C15. A computer program product for updating a subscriber identity module (SIM) on a host device, the computer program product comprising code embodied on a non-transient computer-readable medium and configured so as when executed on a processor to perform the method of any preceding clause.

It will be appreciated that the above embodiments have been described only by way of example, and other variants or applications may be apparent to a person skilled in the art given the disclosure herein.

What is claimed is:

1. A method performed by a server, the method comprising:

receiving, from a device over a network, an agent identifier and a subscriber identity module, SIM, identifier of a SIM on the device;

generating a random value;

transmitting the random value and the SIM identifier of the SIM to an authentication entity;

receiving an authentication response from the authentication entity wherein the authentication response is generated using the random value;

deriving a pre-shared key using the authentication response;

storing the derived pre-shared key in association with the agent identifier in a memory;

transmitting the random value to the device over the network;

encrypting a message using the pre-shared key; and transmitting the encrypted message over the network to the device.

2. The method of claim 1, further comprising:

receiving an update request message over the network from the device, wherein the update request message comprises the agent identifier and is encrypted prior to transmission using the pre-shared key;

decrypting the update request message using the stored pre-shared key; and transmitting an update response message as the message over the network to the device, wherein the update response message comprises update data and is encrypted using the stored pre-shared key.

3. The method of claim 2, wherein the update request message is decrypted with a first session key derived from the pre-shared key, and the update response message is encrypted with a second session key derived from the pre-shared key.

4. The method of claim 1, wherein the random value is a challenge.

5. The method of claim 1, wherein the authentication response comprises a signed response and a cipher key.

6. The method of claim 5, wherein the pre-shared key is derived further using at least one of the signed response and the cipher key.

7. The method of claim 1, wherein the message includes data to be used in the subscriber identity module, SIM, on the device.

8. A server comprising at least one processor configured to:

receive, from a device over a network, an agent identifier and a subscriber identity module, SIM, identifier of a SIM on the device;

generate a random value;

transmit the random value and the SIM identifier of the SIM to an authentication entity;

receive an authentication response from the authentication entity wherein the authentication response is generated using the random value;

derive a pre-shared key using the authentication response;

store the derived pre-shared key in association with the agent identifier in a memory;

transmit the random value to the device over the network;

encrypt a message using the pre-shared key; and transmit the encrypted message over the network to the device.

9. A nontransitory computer readable medium storing a computer program, the computer program comprising code configured so as when executed on a processor of a server to perform the method of claim 1.

10. A method performed by a server, the method comprising:

transmitting a random value to an authentication entity;

receiving an authentication response from the authentication entity wherein the authentication response is generated using the random value;

deriving a pre-shared key using the authentication response;

transmitting the random value to a device over a network;

encrypting a message using the pre-shared key;

transmitting the encrypted message over the network to the device;

receiving an update request message over the network from the device, wherein the update request message comprises an agent identifier and is encrypted prior to transmission using the pre-shared key;

decrypting the update request message using the stored pre-shared key; and transmitting an update response message as the message over the network to the device, wherein the update response message comprises update data and is encrypted using the stored pre-shared key.

11. The method of claim 10, wherein the update request message is decrypted with a first session key derived from the pre-shared key, and the update response message is encrypted with a second session key derived from the pre-shared key.

12. The method of claim 10, wherein the random value is a challenge.

13. The method of claim 10, wherein the authentication response comprises a signed response and a cipher key.

14. The method of claim 13, wherein the pre-shared key is derived further using at least one of the signed response and the cipher key.

15. The method of claim 10, wherein the message includes data to be used in the subscriber identity module, SIM, on the device.

16. A nontransitory computer readable medium storing a computer program, the computer program comprising code configured so as when executed on a processor of a server to perform the method of claim 1.

* * * * *